Figures 1, 2:
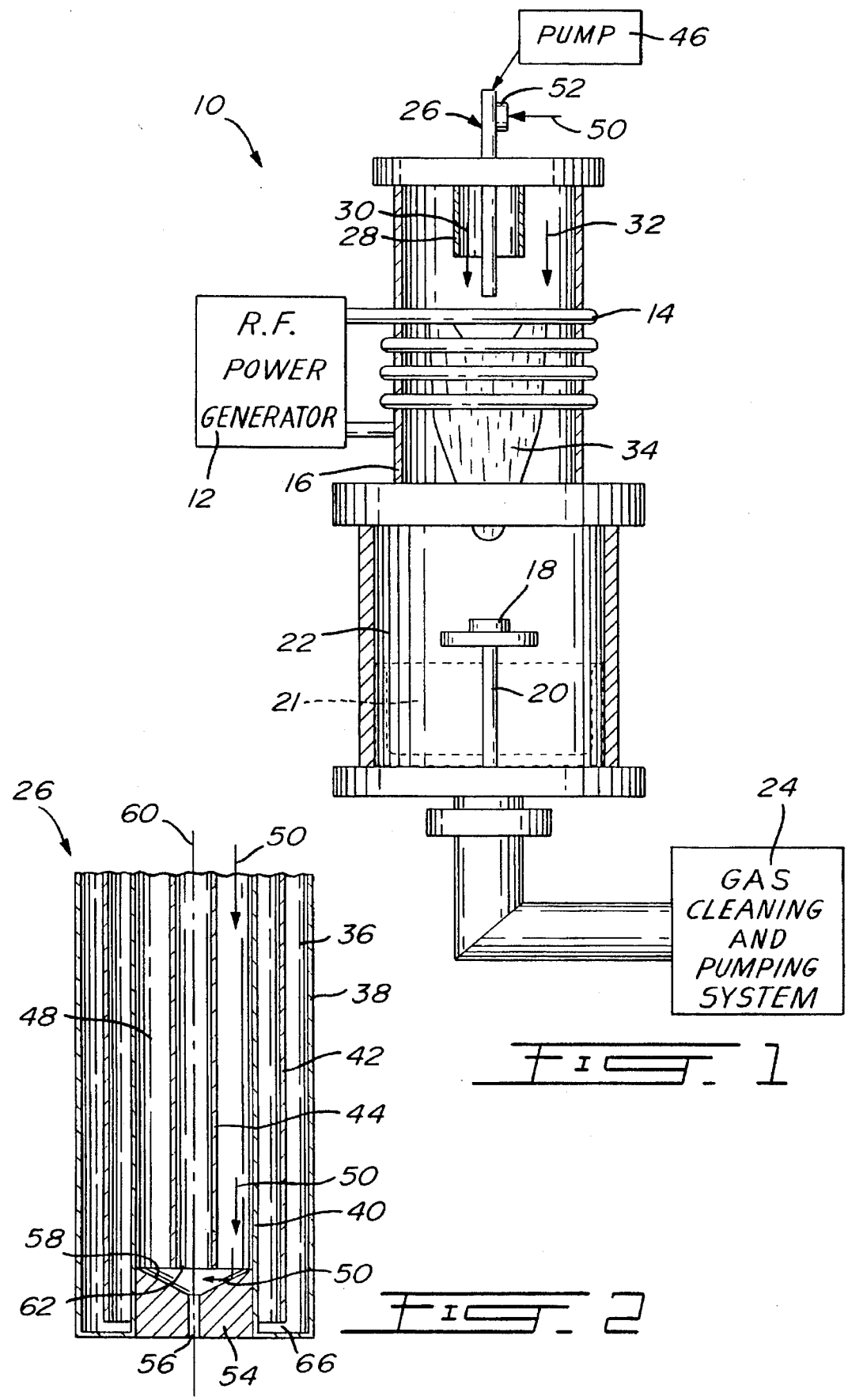

United States Patent [19]
Gitzhofer et al.

[11] Patent Number: 5,609,921
[45] Date of Patent: Mar. 11, 1997

[54] SUSPENSION PLASMA SPRAY

[75] Inventors: François Gitzhofer; Etienne Bouyer; Maher I. Boulos, all of Sherbrooke, Canada

[73] Assignee: Universite de Sherbrooke, Sherbrooke, Canada

[21] Appl. No.: 296,674

[22] Filed: Aug. 26, 1994

[51] Int. Cl.$^6$ .................................................. C23C 4/12
[52] U.S. Cl. .................... 427/446; 427/562; 427/569; 264/6; 264/117; 264/483
[58] Field of Search ..................... 427/446, 447, 427/562, 564, 569, 576; 264/6, 117, 483

[56] References Cited

U.S. PATENT DOCUMENTS

| | | | |
|---|---|---|---|
| 3,187,717 | 6/1965 | Pearsall | 118/64 |
| 3,340,020 | 9/1967 | Neuenschwander et al. | 23/349 |
| 3,903,891 | 9/1975 | Brayshaw | 128/303.14 |
| 4,109,863 | 8/1978 | Olson et al. | 239/102 |
| 4,146,936 | 4/1979 | Aoyagi et al. | 427/2.27 |
| 4,361,114 | 11/1982 | Gurev | 118/723 |
| 4,818,837 | 4/1989 | Pfenaer | 427/446 |
| 4,853,250 | 8/1989 | Boulos et al. | 427/34 |
| 4,897,282 | 1/1990 | Kniseley et al. | 427/34 |
| 4,978,067 | 12/1990 | Berger et al. | 239/102.2 |
| 4,982,067 | 1/1991 | Marantz et al. | 427/446 |
| 5,030,474 | 7/1991 | Saita et al. | 427/2.27 |
| 5,032,568 | 7/1991 | Lau et al. | 505/1 |
| 5,128,169 | 7/1992 | Saita et al. | 427/2.27 |
| 5,189,010 | 2/1993 | Strom et al. | 505/1 |
| 5,217,747 | 6/1993 | Tsantrizos et al. | 427/455 |
| 5,247,841 | 9/1993 | Ulrich et al. | 73/864.81 |
| 5,247,842 | 9/1993 | Kaufman et al. | 73/865.5 |
| 5,260,105 | 11/1993 | Wang | 427/576 |

FOREIGN PATENT DOCUMENTS

| | | |
|---|---|---|
| 0407698 | 1/1991 | European Pat. Off. . |
| 2690638 | of 1993 | France . |
| 6427132 | 12/1987 | Japan . |
| 109713 | 8/1925 | Switzerland . |
| 851594 | 10/1960 | United Kingdom . |
| 1151423 | 5/1969 | United Kingdom . |
| 1321481 | 6/1973 | United Kingdom . |
| WO91/03323 | 3/1991 | WIPO . |

OTHER PUBLICATIONS

Patent abstracts of Japan vol. 10 No. 355 (C–388) 29 Nov. 1986 & JP,A,61 155295 (Showa Denko) 14 Jul. 1986 "Process for Treating Substrate to be Used for Diamond Synthesis by CVD Method".

Patents abstracts of Japan vol. 14 No. 492 (C–0773), 26 Oct. 1990 & JP,A,02 203853 (Kobe Steel) 13 Aug. 1990 "Manufacture of Implant Member".

"High Tc Superconductors—Composite Wire Fabrication", Jin et al., *Appl. Phys. Lett.* 51 (3): 754–756 (Jul. 20, 1987).

"Low-temperature Preparation of High Tc Superconducting Thin Films", Wu et al., *Appl. Phys. Lett.* 52, (9): 203–204 (Feb. 29, 1988).

"Low Temperature CVD Garnet Growth" M. E. Cowher and T. O. Sedgwick Journal of Crystal Growth 46 (1979) pp. 399–402 (no month date).

(List continued on next page.)

*Primary Examiner*—Katherine A. Bareford
*Attorney, Agent, or Firm*—Merchant, Gould, Smith, Edell, Welter & Schmidt, P.A.

[57] ABSTRACT

The plasma spray method produces a material deposit on a substrate to form either a protective coating of a near net shape body, or produces a powder of a given material. The material is supplied to a plasma discharge in the form of a suspension comprising small solid particles of that material dispersed into a liquid or semi-liquid carrier substance. The suspension is brought into the plasma discharge by an atomizing probe using a pressurized gas to shear the suspension and thus atomize it into a stream of fine droplets. The plasma discharge vaporizes the carrier substance and agglomerate the small solid particles into partially or totally melted drops which are accelerated to hit the substrate and form thereon the coating or near net shape body. Alternatively, the molten drops can be solidified in-flight and collected into a vessel to produce a powder of that material.

13 Claims, 1 Drawing Sheet

OTHER PUBLICATIONS

"Stability of Ultrafine Tetragonal $ZrO_2$ precipitated with $Al_2O_3$ by the Spray–ICT Technique" M. Kagawa, M. Kikuchi and Y. Syono—Journal of the American Ceramic Society vol. 66 No. 11, pp. 751–754 (no month date).

"Formation of boron carbide in a high–intensity arc plasma" A. J. Wickens Chemistry and Industry pp. 316–317 (no date).

"Essai de synthèse du carbure et du nitrure de bore" F. M. Bosch and I. A. de Vynck Silicates Industriels 1962 vol. 27 pp. 587–590 (no month date).

"The Structure of $La_2CuO_4$ and $LaSrVO_4$" J. M. Longo and P. M. Raccah, Journal of Solid State Chemistry 6, 526–531 (1973) (no month date).

No Title I. M. MacKinnon & B. G. Reuben, Journal of Electrochemical Society vol. 122 No. 6, Jun. 1975 pp. 806–811.

"Low Temperature CVD Garnet Growth" M. E. Cowher and T. O. Sedgwick, Journal of Crystal Growth 46 (1979) pp. 399–402 (no month date).

"Precipitation of $\gamma$–$Fe_2O_3$ from Ultrahigh Temperature Plasma" M. Kagawa et al. Jap. Jour. of Appl. Physics, vol. 24, No. 4, 1985 pp. 477–481 (no month date).

"Reactive Evaporation of Chevrel Phase Superconducting Compounds" R. J. Webb, IEEE Transactions on Magnetics, Mar. 1985, pp. 835–837.

"An evaporation system for the preparation of ternary compounds" R. J. Webb et al. J. Vac. Sci. Technol. vol. 3 No. 5, Sep./Oct. 1985, pp. 1907–1912.

"Possible High $T_c$ Superconductivity in the Ba–La–Cu–O system" Bednorz et al. Z. Phys. B–Condensed Matter (1986) pp. 189–192 (no month date).

"Evidence for Superconductivity above 40 K in the La–Ba–Cu–O Compound System" Chu et al. Physical Review Letters, Jan. 1987 vol. 58 No. 4, pp. 405–407.

"Large area plasma spray deposited superconducting $YBa_2Cu_3O_7$ Thick films" Cuomo et al. Advanced Ceramic Materials, vol. 2, No. 3B (1987) pp. 422–429 (no month date).

"Superconductivity at 93 K in a New Mixed–Phase Y–Ba–Cu–O Compound System at Ambient Pressure" Wu et al. Physical Review Letters 1987, vol. 58 No. 9, pp. 908–910 (no month date).

"Thin superconducting oxide films" Laibowitz et al. Physical Review B vol. 35, No. 16, pp. 8821–8823 (no date).

"Oxygen Stoichiometry in $Ba_2YCu_3O_x$," Gallagher et al., Mat. Res. Bull., 1987 vol. 22, No. 7, pp. 995–1006 (no month date).

"Evidence for Superconductivity in $La_2CuO_4$" Grant et al. Physical Review Letters Jun. 1987, vol. 58, No. 23, pp. 2482–2484.

"Influence of oxygen defects on the physical properties of $La_2CuO_{4-y}$" Johnston et al. Physical Review B, Sep. 1987, vol. 36, No. 7, pp. 4007–4008.

"Superconductivity at 155 K" Ovshinsky et al. Physical Review Letter, 1987 vol. 58, No. 24, pp. 2579–2581 (no month date).

"Structural and superconducting properties of orientation–ordered $Y_1Ba_2Cu_3O_{7-x}$ films prepared by molecular–beam epitaxy" Kwo et al. Physical Review B 1987 vol. 36, No. 7, pp. 4039–4042 (no month date).

"High Tc Thin Films by Chemical Spray Deposition" Meng et al. Int. Journ. of Modern Physics B 1987 vol. 1, No. 2, pp. 413–416 (no month date).

"Superconducting Y–Ba–Cu–O oxide films by sputtering" Hong et al. Appl. Phys. Lett. 1987 vol. 51 No. 9, pp. 694–696 (no month date).

"Critical current densities and transport in superconducting $YBa_2Cu_3O_{7-\delta}$ films made by electron beam coevaporation" Oh et al. Appl. Phys. Lett. 1987, vol. 51, No. 11, pp. 852–854 (no month date).

"Critical Current Density of Y–Ba–Cu Oxide Wires" Kohno et al. pp. 1653–1656 (no date).

"Preparation and substrate reactions of superconducting Y–Ba–Cu–O films" Gurvitch et al. Appl. Phys. Lett. 1987, vol. 51, No. 13, pp. 1027–1029 (No month date).

"Production of $YBa_2Cu_3O_{7-y}$ superconducting thin films by high–pressure reactive evaporation and rapid thermal annealing" Lathrop et al. Appl. Phys. Lett. 1987, vol. 51, No. 19, pp. 1554–1555 (no month date).

"Reproducible technique for fabrication of thin films of high transition temperature superconductors" Mankiewich et al. Appl. Phys. Lett. 1987, vol. 51, No. 21, pp. 1753–1755 (no month date).

"Superconductors as Very High–Speed System–Level Interconnects" Kwon et al. IEEE Electron Dev. Letters, 1987, vol. EDL–8, No. 12, pp. 582–585 (no month date).

"High critical–current density $Ba_2YCu_3O_7$ thin films produced by coevaporation of Y, Cu, and $BaF_2$" Mankiewich et al. Mat. Res. Soc. Proc, 1988, vol. 99, pp. 119–125 (no month date).

"Ultra high speed electronics based on proposed high $T_c$ superconductor switching devices" Biegel et al. SPIE, 1988, vol. 948, pp. 3–9 (no month date).

"Effect of oxidizing atmosphere on superconductivity in $RBaCu_{3-x}M_xO_z$," Robinson et al. Mat. Res. Soc. Symp. Proc. 1988, vol. 99. pp. 587–590 (no month date).

"Superconductivity at 90 K in the Tl–Ba–Cu–O system" Sheng et al. Physical Review Letters, 1988, vol. 60, No. 10, pp. 937–940 (no month date).

"The effect of density on critical current and oxygen stoichiometry of $YBa_2Cu_3O_x$ superconductors" Alford et al. Letters to Nature 1988, vol. 332, No. 3, pp. 58–59 (no month date).

"Superconductivity in the rare–earth–free Tl–Ba–Cu–O system above liquid–nitrogen temperature" Sheng et al., Letters to Nature 1988, vol. 332, No. 3, pp. 55–57 (no month date).

"A New High–$T_c$ Oxide Superconductor without a Rare Earth Element" Maeda et al. Japanese Journal of Applied Physics 1988, vol. 27, No. 2, pp. L209–L210 (no month date).

"A New High–Temperature Supercoductor: $Bi_2Sr_{3-x}CA_xCu_2O_{8+y}$," Subramanian et al. Science, 1988, vol. 239, pp. 1015–1017 (no month date).

"In situ preparation of Y–Ba–Cu–O superconducting thin films by magnetron sputtering" Li et al. Appl. Phys. Lett. 1988, vol. 52, No. 13, pp. 1098–1100 (no month date).

"Effect of Overcoating with Dielectric Films on the Superconductive Properties of the High–$T_c$ Y–Ba–Cu–O films" Ichikawa et al. 1988, pp. L381–L383 (no month date).

"100–K Superconducting Phases in the Ti–Ca–Ba–Cu–O System" Hazen et al. Physical Review Letters 1988, vol. 60, No. 16, pp. 1657–1660 (no month date).

"Preparation of superconducting Y–Ba–Cu–O films by a reactive plasma evaporation method" Terashima et al. Appl. Phys. Lett 1988, vol. 52, No. 15, pp. 1274–1276 (no month date).

"Aerosol flow reactor production of fine $Y_1Ba_2Cu_3O_7$ powder: Fabrication of superconducting ceramics" Kodas et al. Appl. Phys. Lett. 1988, vol. 52, No. 19, pp. 1622–1623 (no month date).

"Crystal structure of the high–temperature superconductor $Tl_2Ba_2CaCu_2O_8$" Subramanian et al. Letters to Nature 1988, vol. 332, No. 31, pp. 420–422 (no month date).

"As–deposited superconducting Y–Ba–Cu–O thin films on $Si, Al_2O_3$, and $SrTiO_3$ substrates" Silver et al. Appl. Phys. Lett. 1988, vol. 52, No. 25, pp. 2174–2176 (no month date).

"Superconductivity near 30 K without copper: the $Ba_{0.6}K_{0.4}BiO_3$ perovskite" Cava et al. Letters to Nature 1988, vol. 332, pp. 814–816 (no month date).

"Ozone–UV irradiation effects on $Ba_2YCu_3O_{7-x}$ thin films" Tamura et al. Appl. Phys. Lett. 1988, vol. 52, No. 25, pp. 2183–2185 (no month date).

"High $T_c YBa_2Cu_3O_{7-x}$ thin films on Si substrates by dc magnetron sputtering from a stoichiometric oxide target" Lee et al. Appl. Phys. Lett. 1988, vol. 52, No. 26, pp. 2263–2265 (no month date).

"Deposition of superconducting Y–Ba–Cu–O films at 400° C. without post–annealing" Witanachchi et al. Appl. Phys. Lett. 1988, vol. 53, No. 3, pp. 234–236 (no month date).

"Two–dimensional superstructure in the (001) plane of $Bi_2[Ca,Sr]_3Cu_2O_{8+\delta}$ thin films" Marshall et al. Appl. Phys. Lett. 1988, vol. 53, No. 5, pp. 426–427 (no month date).

"Thin–film Bi–Sr–CA–Cu–O high–temperature superconductors using pulsed laser evaporation from sintered disks" Appl. Phys. Lett. 1988, vol. 53, No. 6, pp. 532–533 (no month date).

"Superconducting $Tl_2Ba_2CuO_6$: The Orthorhombic Form" Parise et al., Journal of Solid State Chemistry 1988, vol. 76, pp. 432–436 (no month date).

"High $T_c$ Superconducting Thin films" R. B. Laibowitz, MRS Bulletin 1989 pp. 58–62 (no month date).

"Deposition of $YBa_2Cu_3O_{7-x}$ Thick Films by the Spray–ICP Technique" Zhu et al. Dept. of Mechanical Engineering, Univ. of Minnesota, 1989 (no month date).

"In Situ Growth of Bi–Sr–Ca–Cu–O thin Films by Molecular Beam Epitaxy Technique with Pure Ozone" Nakayama et al. Dept. of Applied Physics, Univ. of Tokyo 1989, pp. L1217–L1219 (no month date).

"Preparation of Y–Ba–Cu–O Superconducting Thin Films by the Mist Microwave Plasma Decomposition Method" Koukitu et al. Jap. Jour. of Appl. Phy. 1989, vol. 28, No. 7, pp. L1212–L1213 (no month date).

SUSPENSION PLASMA SPRAY

BACKGROUND OF THE INVENTION

1. Field of the Invention

The present invention relates to a plasma spray deposition method for producing a material deposit onto a substrate. The plasma deposition method may be used either to produce a protective coating of the substrate or to form a near net shape body on this substrate. More particularly, the present invention relates to a plasma spray deposition method in which the material to be deposited is supplied in the form of a suspension including solid particles of the material dispersed into a liquid or semi-liquid carrier substance.

The present invention further relates to a method using the same technique for producing a powder of a given material from a suspension of that material.

2. Brief Description of the Prior Art

Plasma deposition of particulate materials, in particular ceramic and metallic powders, has been known and used on an industrial scale since the late 60's and early 70's.

However, the conventional plasma deposition methods using particulate materials such as ceramic and metallic powders have many drawbacks essentially related to the production of these powders. Indeed, powders having a high added value are generally chemically synthesized using precipitation or co-precipitation processes. Obtention of powders having adequate particle size distribution from these precipitates require many lengthy steps likely to introduce impurities in the powders. Obviously, these impurities degrade the properties of the powders.

For example, to produce hydroxyapatite (HAP) which is a bioceramic material having a chemical composition similar to that of human hard tissues (bones and teeth), calcium hydroxide is reacted with phosphoric acid to obtain a gel precipitate which is transformed into powder by means of the following steps:

drying at 180° C.;

calcination at 800° C.;

sintering at 1150° C.;

crushing; and screening.

The product obtained from the screening step is a powder that can be deposited by known plasma deposition methods, usually involving a carrier gas to carry the powder to the plasma discharge.

Since HAP is a material used for coating implants, impurities is likely to cause biocompatibility problems.

Another important drawback of the plasma deposition of particulate materials injected in the plasma discharge by means of a carrier gas is the possible partial decomposition of the powder under the influence of the high temperature of the plasma discharge. The degree of decomposition depends on the plasma composition and the contact time.

In an attempt to overcome these drawbacks, it has been proposed to replace the powder by an aqueous solution of the material to be deposited (U.S. Pat. No. 5,032,568 granted to Lau et al. on Jul. 16, 1991). In this patent, metal salts are dissolved in water and the resulting aqueous solution is atomized and then injected into an inductively coupled radio-frequency plasma torch where it is vaporized to form on a target surface a film comprising a mixed oxide of the dissolved metal ions.

Applicability of the method of Lau et al. is limited since many materials to be deposited on a substrate cannot be dissolved in water or other liquid. Another drawback of the method of Lau et al. is that vaporisation of the dissolved material being deposited may lead to changes in the properties of the deposit. Finally, vapour deposition is very slow.

OBJECTS OF THE INVENTION

An object of the present invention is therefore to overcome the above discussed drawbacks of the conventional plasma deposition methods by using a suspension of particles of the material to be deposited in a liquid or semi-liquid carrier substance.

Another object of the present invention is to provide a plasma spray method for producing a powder of a given material from a suspension of that material.

SUMMARY OF THE INVENTION

More specifically, in accordance with the present invention, there is provided a plasma spray deposition method for producing a material deposit onto a substrate, comprising the steps of:

producing a plasma discharge;

providing a suspension of a material to be deposited, this suspension comprising small solid particles of that material dispersed into a liquid or semi-liquid carrier substance;

atomizing the suspension into a stream of fine droplets and injecting the stream of fine droplets within the plasma discharge; and by means of the plasma discharge, (a) vaporizing the carrier substance, (b) agglomerating the small particles into at least partially melted drops, (c) accelerating these drops, and (d) projecting the accelerated drops onto the substrate to form the material deposit.

The plasma deposition method of the invention may be used either to produce a protective coating of the substrate or to form a near net shape body on the substrate.

In accordance with another aspect of the present invention, there is provided a plasma spray powder producing method for producing a powder of a given material, comprising the steps of:

producing a plasma discharge;

providing a suspension of that given material, this suspension comprising small solid particles of the material dispersed into a liquid or semi-liquid carrier substance;

atomizing the suspension into a stream of fine droplets and injecting that stream of fine droplets within the plasma discharge;

by means of the plasma discharge, vaporizing the carrier substance and agglomerating the small particles into at least partially melted drops; and solidifying these drops in-flight to thereby form a powder of the given material.

In accordance with a further aspect of the present invention, there is provided an atomizing probe for carrying out the atomizing and injecting steps of the plasma spray deposition method according to the invention. This atomizing probe comprises:

an inner conduit member having a first end and a second discharge end, and being supplied with the suspension at the first end thereof; and an outer conduit member surrounding the inner conduit member to define an annular chamber between the inner and outer conduit members, the outer conduit member having a first end and a second end adjacent the second discharge end of the inner conduit member, and the annular chamber being supplied with a pressurized atomizing gas at the first end of the outer conduit member.

The outer conduit member comprises at the second end thereof an inner end wall formed with a central opening situated substantially in alignment with the inner conduit member, this inner end wall being spaced apart from the second discharge end of the inner conduit member and the inner end wall converging toward the opening whereby the pressurized gas is deflected toward the suspension discharged from the second end of the inner conduit member to shear this suspension into a stream of fine droplets ejected from the probe through the opening.

Preferably, the inner end wall is conical.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a schematic diagram of a plasma spray torch in accordance with the present invention, for producing material deposits or for producing material powders from material suspensions; and FIG. 2 is a schematic diagram of a probe for atomizing the suspension within the plasma discharge of the torch of FIG. 1.

DETAILED DESCRIPTION OF THE PREFERRED EMBODIMENT

Referring to FIG. 1, an inductively coupled radio-frequency (RF) plasma torch 10 is schematically illustrated.

Since inductively coupled RF plasma torches are well known to those of ordinary skill in the art, the description of the plasma torch 10 will be succinct. The plasma torch 10 includes a RF power generator 12 supplying a RF current to an induction coil 14 wound around a plasma confinement tube 16, confining the plasma discharge 34. A substrate 18 on which the plasma sprayed material is to be deposited is placed on a support 20, advantageously capable of rotating and translating to produce a more uniform deposit layer. Support 20 is enclosed in a reactor 22 held at atmosphere or low pressure. The exhaust gases pass through a gas cleaning and pumping system 24 prior to being released in the atmosphere.

An atomizing probe 26 is centrally mounted in the confinement tube 16 and an intermediate quartz tube 28, having a smaller diameter than the confinement tube 16, is interposed between the probe 26 and the confinement tube 16. A central gas (see arrow 30) is injected in the quartz tube 28, and a sheath gas (see arrow 32) is injected in the annular passage defined between the quartz tube 28 and the plasma confinement tube 16.

The atomizing probe 26 will now be further described with reference to FIG. 2. The probe 26 is cooled by a cooling fluid flowing in an annular chamber 36 centered on the longitudinal axis 60 of the probe 26. The chamber 36 is delimited by an outer cylindrical tube 38 and an inner cylindrical tube 40, and comprises an intermediate cylindrical tube 42 interposed between the outer tube 38 and the inner tube 40 to separate a cooling fluid inlet (not shown) and a cooling fluid outlet (not shown). The intermediate tube 42 leaves an annular passage 66 at the lower end of the probe 26 to ensure proper flow of cooling fluid from the cooling fluid inlet to the cooling fluid outlet, to efficiently cool the probe 26.

The atomizing probe 26 also includes a cylindrical, suspension injection tube 44 centered on the longitudinal axis 60 and therefore coaxial with the annular chamber 36. A pump 46 (FIG. 1) supplies the injection tube 44 with a suspension of the material to be plasma sprayed.

Between the injection tube 44 and the inner tube 40 is defined an annular chamber 48 supplied with an atomizing gas (see arrow 50) through a gas inlet 52 (FIG. 1). The function of the gas 50 is to atomize the suspension supplied to the injection tube 44 as will be described hereinafter.

Probe 26 further comprises a thick circular disk 54 having a central opening 56 centered on the axis 60 and therefore in alignment with the tube 44. The top surface 58 of disk 54 defines a conical inner end wall of the cylindrical tube 40 spaced apart from the suspension discharge end 62 of tube 44 and converging toward the central opening 56; the conical end wall 58 defines a slope toward opening 56.

Having described the various components forming the preferred embodiment of the present invention, attention will now be given to the operation of the atomizing probe 26 and plasma torch 10.

The probe 26 atomizes the suspension supplied through the injection tube 44 into a stream of fine droplets and injects this stream of droplets generally centrally of the plasma discharge 34. More specifically, when the gas 50 flowing downwardly through the annular chamber 48 reaches the conical inner end wall 58, the gas flow is deflected to become angular to the suspension flow from the discharge end 62 of the tube 44. The suspension is then sheared and thereby atomized, and injected in the plasma discharge 34 under the form of fine droplets through the opening 56.

Although an embodiment of atomizing probe 26 has been described hereinabove, the present invention is not limited to the use of this probe and alternative atomizing processes are available to shear the suspension.

The stream of fine droplets travels through the plasma discharge 34 to reach the substrate 18. As the droplets of suspension travel from the opening 56 to the substrate 18, these droplets are subjected to several physicochemical transformations. It should be pointed out here that the suspension is composed of small solid particles suspended and dispersed into a solvent or other liquid or semi-liquid carrier substance. When the fine droplets of suspension reach the plasma discharge 34, the solvent first evaporates and the vapour thus formed decomposes under the extreme heat of the plasma. The remaining aerosol of small solid particles then agglomerate into drops which are either totally or partially melted and/or vaporized.

The plasma discharge 34 accelerates the molten drops, which accumulate kinetic energy. Carried by this kinetic energy, the drops hit the substrate 18. The plurality of drops form, on the substrate 18, a layer of partially or totally melted drops partially overlapping one another.

It should be pointed out here that the suspension to be plasma sprayed, containing often more than 40% of dry matter, is mixed with an organic salt acting as deflocculant to prevent agglomeration of the solid matter in the suspension prior to the atomization and to reduce the viscosity of the suspension.

It should also be pointed out that the RF plasma torch could be replaced by a DC plasma torch. However, if a DC plasma torch is used, impurities may be added to the drops of solid aerosol particles since, as well known to those of ordinary skill in the art, the electrodes of a DC plasma torch are subjected to erosion. An advantage of RF plasma torches is that they allow use of different types of plasma gases, since oxidizing or reducing gases can be used without risks. Also, the relatively low speeds of the gases (30 m/s) and the relatively large volume of the RF plasma torch (100 $cm^3$) produce contact times between the droplets and the plasma 34 sufficiently long to evaporate the solvent and melt the drops of solid aerosol particles. The relatively low temperature (10,000° K.) combined with the long contact time between the plasma and the drops minimize the risks of overheating, decomposition and vaporization of the drops.

The main advantage of the technique in accordance with the invention is the abolition of the long sequence of steps involved in the preparation of the plasma sprayed powder from a suspension. Indeed, conventional plasma deposition techniques require powder injected in the plasma jet 34 by means of a carrier gas. The technique of the present invention eliminates the numerous, complex and time consuming steps involved in the preparation of a costly powder by atomizing the suspension directly in the plasma.

The technique of the present invention also increases the rate of deposition. When a suspension is used, the rate of deposition may be as high as 20 μm/minute. For the purpose of comparison, if a solution is used instead of a suspension, the rate of deposition is as low as 10 μm/hour.

It should also be pointed out that when water is used as the carrier substance of the suspension, the generated water vapour contributes to raise the water partial pressure in the plasma discharge which may prevent the decomposition of the aerosol particles during the melting step and may promote the formation of crystalline networks in the deposit produced.

Finally, it is possible to replace the substrate 18 and support 20 by a vessel 21 (shown in dashed lines in FIG. 1) placed on the bottom of the reactor 22 to produce a powder directly from a suspension. Those skilled in the art will appreciate that the distance between the plasma discharge 34 and the vessel 21 must be sufficient to allow the partially melted drops to solidify in-flight before they reach the bottom of that vessel 21. Alternatively, devices (not shown) for accelerating solidification of the drops can be used. The produced powder is collected in the vessel 21 and can subsequently be plasma sprayed using conventional techniques. This plasma spray powder producing method therefore eliminates the numerous, complex and time consuming steps involved in the conventional methods of preparing powders to be plasma sprayed.

EXAMPLE

Experiments have been conducted in view of depositing a bioceramic, the hydroxyapatite (HAP), with the technique as described hereinabove and using an experimental set-up generally represented in FIG. 1.

HAP is a material having a composition similar to that of the mineral part of human hard tissues (bones, teeth). HAP is also biocompatible. It is possible to form structural monolithic HAP, but since the mechanical resistance of this ceramic is poor, it is not possible to use it as orthopaedic implants.

Many techniques have been recently developed to provide a bioceramic coating or deposit to a metallic structure. The metallic structure is relatively easy to form and provides a good mechanical resistance to the implant. Plasma deposition offers advantages for the deposition of HAP over the metallic structure since the crystallographic structure and the chemical properties of the HAP deposit may be preserved.

The HAP is usually synthesized using wet chemistry through the reaction of calcium hydroxide with phosphoric acid according to the chemical reaction:

$$10Ca(OH)_2+6H_3PO_4 \rightarrow Ca_{10}(PO_4)_6(OH)_2+18H_2O$$

Conventionally, the white gel precipitate formed is filtered and washed before being spray dried in the form of a coarse powder. The latter powder is then calcined under a controlled atmosphere, crushed and classified to obtain a powder with the required particle size distribution. Since the resulting material is destined to biomedical applications, each of these steps have to be carried out with considerable care to avoid contamination which may be harmful to the human body.

The stringent requirements on purity and particle size distribution of the powder are responsible for the relatively high cost of the material.

The conventional deposition technique involves the injection of the powder using a carrier gas into the plasma flow. The powder is heated and melted, in flight, in a relatively short time (milliseconds). The molten droplets are entrained by the plasma flow and projected against the substrate on which they solidify, forming a thin deposit having a thickness of a few hundred micrometers. The deposit, which is formed by successive splattering of individual molten droplets, usually constitutes a mixture of amorphous and crystalline materials depending on the substrate temperature and the cooling rate of the individual droplets on impact with the substrate.

As the powder is deposited by plasma deposition, it may suffer serious degradation due to its partial decomposition under the influence of the high temperature of the plasma. The degree of degradation depends to a large extent on the plasma composition and the contact time between the plasma and the powder.

If the plasma torch used is a DC plasma torch, erosion of the electrodes may be responsible for further contamination of the deposit by the vaporized and/or sputtered electrode material, usually copper and tungsten which may find its way to the deposit.

With the technique of the present invention, it is possible to achieve a substantial reduction of the steps involved in the production of HAP deposit, and consequently reduce the cost and potential contamination of the deposit. Indeed, with the novel technique described herein, it is possible to plasma spray an HAP suspension, without having to reducing it to powder beforehand, by direct injection of an aqueous suspension of the HAP slurry (formed of HAP gel in water) centrally of the plasma discharge 34.

The experimental set-up (FIG. 1) is based on a inductively coupled RF plasma torch having a nominal power of 50 kW and an oscillating frequency of 3 MHz, associated with a reactor operating at low pressures. The suspension supply pump 46 (FIG. 1) is a peristaltic pump.

To achieve the injection of the HAP suspension directly in the center of the plasma discharge, the white gel resulting from the chemical reaction described above is decanted to increase the content of dry matter up to 40% by weight. A deflocculant is then added to decrease the viscosity of the gel and thus allowing this gel to be brought to the center of the plasma 34 through the injection tube 44.

The HAP suspension is atomized into a stream of fine droplets and is injected into the plasma as described hereinabove. The droplets are dried in flight, calcined and melted in a single step. The droplets agglomerate to form drops of partially or totally melted HAP. The molten drops of HAP are then deposited on the substrate 18 to form a hard and dense HAP deposit.

Operating in an atmosphere with a high partial pressure of water vapour presents the added advantage that transformation of HAP from an amorphous form into a crystalline one during the plasma spray deposition process is promoted by the presence of water vapour. Therefore a post-treatment in view of increasing the crystallinity of the deposit is no longer required. Furthermore, the rate of deposition of HAP is higher with the present invention than with the conventional techniques involving powders.

As it will be understood by those of ordinary skill in the art of plasma deposition, the above discussed example describing the plasma spray deposition of a suspension of hydroxyapatite using an inductively coupled RF plasma torch is not to be taken as a limitation of the type of material having the possibility of being plasma sprayed according to the present method.

Also, as mentioned in the foregoing description, the plasma deposition method of the invention is suitable to either produce a protective coating of the substrate or form a near net shape body on that substrate.

Finally, when the substrate 18 and support 20 are replaced by the vessel 21 as described hereinabove, HAP powder can be easily produced and collected in vessel 21 to thereby eliminate the numerous, complex and time consuming steps involved in the conventional methods of preparing HAP powder thus substantially reducing the costs of production and the risks of contamination of the powder. This is made, as described hereinabove, by solidifying the partially melted drops of HAP from the plasma discharge and collecting these drops into the vessel 21.

Although the present invention has been described hereinabove by way of a preferred embodiment thereof, this embodiment can be modified at will, within the scope of the appended claims, without departing from the spirit and nature of the subject invention.

What is claimed is:

1. A plasma spray method for agglomerating solid particles of a given material into at least partially melted drops, comprising the steps of:

producing an inductively coupled RF plasma discharge;

providing a suspension of said material, said suspension comprising solid particles of said material dispersed into a liquid or semi-liquid carrier substance;

atomizing said suspension into a stream of droplets and injecting said stream of droplets generally centrally of the plasma discharge; and by means of the plasma discharge, (a) vaporizing said carrier substance, and (b) agglomerating the particles into said at least partially melted drops.

2. A plasma spray method as defined in claim 1, further comprising the steps of, by means of the plasma discharge, accelerating said drops and projecting the accelerated drops onto a substrate to form a material deposit.

3. A plasma spray method as defined in claim 2, comprising forming with said material deposit a coating on said substrate.

4. A plasma spray method as defined in claim 2, comprising forming with said material deposit a near net shape body on the substrate.

5. A plasma spray method as defined in claim 1, wherein the step of providing a suspension of the material comprises:

conducting a chemical reaction in order to obtain a precipitate of said material in suspension in said liquid or semi-liquid carrier substance;

decanting the suspension to increase the concentration of said material;

pumping the suspension to an atomizing probe for atomizing the suspension into said stream of droplets.

6. A plasma spray method as defined in claim 5, wherein said chemical reaction conducting step comprises conducting a chemical reaction between calcium hydroxide and phosphoric acid.

7. A plasma spray method as defined in claim 6, wherein said material comprises hydroxyapatite, and wherein said carrier substance comprises water.

8. A plasma spray method as defined in claim 1, wherein said material comprises hydroxyapatite, and wherein said carrier substance comprises water.

9. A plasma spray method as defined in claim 1, wherein atomizing of said suspension comprises:

supplying said suspension through a conduit member having a discharge end; and shearing the suspension at the discharge end of said conduit by means of a pressurized atomizing gas.

10. A plasma spray method according to claim 1, further comprising the step of solidifying said drops in-flight to form a powder of said material.

11. A plasma spray method according to claim 1, wherein said agglomerating step involves a physicochemical reaction between said material of the particles and the carrier substance.

12. A plasma spray method according to claim 1, wherein said agglomerating step involves a physicochemical reaction between said material of the particles and a plasma gas present in the plasma discharge.

13. A plasma spray method according to claim 1, wherein the RF plasma discharge includes plasma gasses moving at a speed of about 30 m/s.

* * * * *